UNITED STATES PATENT OFFICE.

LOUIS EMILE JANNIN, OF PARIS, FRANCE.

IMPROVEMENT IN COMPOSITION FOR STEREOTYPE-MOLDS.

Specification forming part of Letters Patent No. 221,825, dated November 18, 1879; application filed October 17, 1879; patented in France, February 28, 1879.

*To all whom it may concern:*

Be it known that I, LOUIS EMILE JANNIN, of Paris, France, have invented a new and Improved Stereotype Plate or Block and process for producing the same, which process is also applicable for the reproduction of works of art and similar objects; and I do hereby declare that the following is a full, clear, and exact description of the same.

This invention relates to an improved mold or matrix for forming stereotype-plates from plastic substances.

It consists of a mold or matrix for forming stereotype-plates, made from a mastic or cement, which possesses the property of reproducing the finest details, of hardening in a very short time, of sustaining considerable pressure, and of withstanding a high degree of heat.

The mastic or cement from which I form the molds or matrices is composed of protoxide of lead (preferably that known in commerce as "massicot") and glycerine, mixed together in suitable proportions. It is impossible to lay down any precise and exact proportions in which they should be mixed, as they will vary according to the quality of the work to be done. For instance, where a mold or matrix is to be formed from an engraving having very fine and delicate lines a softer mass would be required, and consequently the cement would contain a greater amount of glycerine, than for an engraving having bold and well-defined lines.

Other metallic oxides may be mixed with this cement to adapt the quality or color of it to the use for which it is intended; but in all cases the protoxide of lead and glycerine are to be the essential elements.

The distinguishing features of molds formed from this cement are that they will receive into their most delicate lines or cavities the plastic substance of which the plates are composed. They harden in a very few moments under the influence of a gentle heat, after which they resist heat and will bear considerable pressure, and, notwithstanding the cement hardens very rapidly, the molds will not shrink. Owing to these characteristics plates formed of this cement can be ground, polished, and otherwise prepared to receive tranfers in an exact similar manner to lithographic stones in common use, and for which they can be used as substitutes.

In carrying my invention into practice I first take the impression of the engraving or other work with the cement, and as soon as it becomes dry and hard I fill in by pressure celluloid, gutta-percha, or other suitable material in a plastic state, and allow it to cool. I am thus enabled to obtain a stereotype-plate in a very short time and at a small cost.

I prefer to use celluloid, since it is proof against acids and capable of sustaining great pressure, and plates formed from it are especially adapted for taking impressions from engraved and etched plates.

Having thus described my invention, what I claim, and desire to secure by Letters Patent, is—

Molds or matrices for forming stereotype-plates from plastic substances, made from a cement composed of protoxide of lead and glycerine, substantially as herein described.

LOUIS EMILE JANNIN.

Witnesses:
ROBT. M. HOOPER,
JEAN BAPTISTE ROLLAND.